(12) United States Patent
Swensen et al.

(10) Patent No.: US 11,377,612 B2
(45) Date of Patent: Jul. 5, 2022

(54) GASEOUS COMBUSTIBLE FUEL CONTAINING SUSPENDED SOLID FUEL PARTICLES

(71) Applicant: OMNIS ADVANCED TECHNOLOGIES, Santa Barbara, CA (US)

(72) Inventors: James S. Swensen, Santa Barbara, CA (US); Simon K. Hodson, Santa Barbara, CA (US)

(73) Assignee: OMNIS ADVANCED TECHNOLOGIES, LLC, Santa Barbara, CA (US)

( * ) Notice: Subject to any disclaimer, the term of this patent is extended or adjusted under 35 U.S.C. 154(b) by 641 days.

(21) Appl. No.: 15/345,170

(22) Filed: Nov. 7, 2016

(65) Prior Publication Data

US 2018/0105760 A1 Apr. 19, 2018

Related U.S. Application Data

(60) Provisional application No. 62/407,872, filed on Oct. 13, 2016.

(51) Int. Cl.
*C10L 3/00* (2006.01)
*C10L 3/06* (2006.01)
(Continued)

(52) U.S. Cl.
CPC ............... *C10L 3/003* (2013.01); *F17D 1/04* (2013.01); *F17D 3/01* (2013.01); *C10L 3/06* (2013.01);
(Continued)

(58) Field of Classification Search
CPC combination set(s) only.
See application file for complete search history.

(56) References Cited

U.S. PATENT DOCUMENTS

| 1,444,665 A | | 2/1923 | Crommett |
| 2,595,234 A | * | 5/1952 | Eastman ................. C10J 1/207 48/202 |

(Continued)

FOREIGN PATENT DOCUMENTS

| CN | 1522956 | * | 8/2004 |
| CN | 103205294 A | | 7/2013 |

(Continued)

*Primary Examiner* — Kaity V Chandler
(74) *Attorney, Agent, or Firm* — Kirton McConkie; Evan R. Witt

(57) ABSTRACT

A gaseous combustible fuel includes a gaseous hydrocarbon fuel feedstock and solid fuel particles suspended in the gaseous hydrocarbon fuel feedstock. The solid fuel particles have a sufficiently small particle size so that they remain suspended during transportation. The hydrocarbon fuel feedstock may include natural gas, ethane, propane, butane, and gaseous derivatives and mixtures thereof. The solid fuel particles may include coal-derived solid carbonaceous matter. Other examples of solid fuel particles include biomass, refined bioproducts, and combustible polymer particles. The gaseous combustible fuel has an energy density at atmospheric pressure which is at least 25% greater than the volumetric energy density of the gaseous hydrocarbon fuel feedstock. Improvements in volumetric energy density of 50%, 100%, and even 500% are disclosed. The gaseous combustible fuel may be pressurized to a pressure in the range from 2 to 100 atmospheres.

29 Claims, 6 Drawing Sheets

(51) Int. Cl.
*F17D 1/04* (2006.01)
*F17D 3/01* (2006.01)

(52) U.S. Cl.
CPC ....... *C10L 2250/00* (2013.01); *C10L 2250/04* (2013.01); *C10L 2250/06* (2013.01)

(56) References Cited

U.S. PATENT DOCUMENTS

| | | | | |
|---|---|---|---|---|
| 2,709,675 | A | * | 5/1955 | Phinney ............... C10B 49/10 201/31 |
| 2,842,319 | A | | 7/1958 | Reerink et al. |
| 3,779,725 | A | * | 12/1973 | Hegarty ................ C10L 3/08 48/202 |
| 3,827,851 | A | * | 8/1974 | Walker ................. F23D 17/00 431/175 |
| 4,756,720 | A | * | 7/1988 | Kikkawa ............... C10L 1/326 44/280 |
| 6,692,661 | B1 | * | 2/2004 | Bedetti ................ C01B 3/363 252/373 |
| 9,017,432 | B2 | | 4/2015 | Brooks et al. |
| 2006/0165582 | A1 | | 7/2006 | Brooker et al. |
| 2007/0199239 | A1 | | 8/2007 | Pourtout |
| 2009/0214992 | A1 | | 8/2009 | McKnight et al. |
| 2010/0233639 | A1 | * | 9/2010 | Richardson ............ F23D 14/32 431/8 |
| 2011/0177558 | A1 | | 7/2011 | Medoff et al. |
| 2012/0271074 | A1 | * | 10/2012 | Boon ................... B01J 29/90 585/240 |
| 2015/0218474 | A1 | * | 8/2015 | Lynch .................. C10L 1/1208 44/457 |
| 2015/0362185 | A1 | | 12/2015 | Van Thorre et al. |
| 2016/0115775 | A1 | | 4/2016 | Eaton et al. |
| 2017/0234619 | A1 | | 8/2017 | Schott et al. |

FOREIGN PATENT DOCUMENTS

| | | |
|---|---|---|
| CN | 103205295 A | 7/2013 |
| CN | 103819626 * | 1/2016 |
| DE | 102014216336 A1 | 2/2016 |
| EP | 0348008 A1 | 12/1989 |

* cited by examiner

GASEOUS COMBUSTIBLE FUEL CONTAINING SUSPENDED SOLID FUEL PARTICLES

CROSS-REFERENCE TO RELATED APPLICATIONS

This application claims the benefit of U.S. Provisional Patent Application No. 62/407,872, filed Oct. 13, 2016, titled GASEOUS COMBUSTIBLE FUEL CONTAINING SUSPENDED SOLID FUEL PARTICLES, which application is incorporated by reference.

BACKGROUND OF THE INVENTION

This disclosure relates to a gaseous fuel that contains suspended solid fuel particles. The fuel may be a combustible gaseous fuel such as natural gas or propane. The suspended solid fuel particles enhance the energy density of the gaseous combustible fuel.

BACKGROUND

The energy density of combustible fuels is a measure of the amount of thermal energy produced by combustion per unit volume. Table 1, below, lists a typical volumetric energy density for three common combustible fuels: natural gas, gasoline, and coal. It will be appreciated that both of the liquid and solid fuel sources, gasoline and coal, possess a significantly higher volumetric energy density compared to the gaseous fuel source, natural gas. Normal temperature and pressure (NPT) is understood to be at 20° C. and 1 atm.

TABLE 1

Energy Density of Selected Combustible Fuels

| Fuel | Energy Density (BTU/m$^3$) |
| --- | --- |
| Natural Gas (@NPT) | 37,000 |
| Gasoline | 29,000,000 |
| Coal | 38,000,000 |

It is known that compressing or pressurizing natural gas, or other combustible gaseous fuel sources, will increase the volumetric energy density, but still at a level well below liquid and solid combustible fuel sources.

It would be an advancement in the art to provide a method of increasing the energy density of natural gas or other combustible gaseous fuels with or without additional pressurization. It would be an advancement in the art to provide a method of increasing the energy density of combustible gaseous fuels, such as natural gas, when pressurized. It would be yet another advancement in the art to reduce the storage volume required and reduce the transport cost per unit of energy for combustible gaseous fuels.

SUMMARY OF THE INVENTION

This disclosure relates to a gaseous combustible fuel comprising predominantly, by volume, a gaseous hydrocarbon feedstock in which solid fuel particles are suspended to enhance the energy density of the gaseous hydrocarbon feedstock. Non-limiting examples of gaseous hydrocarbon fuel feedstock include natural gas, methane, ethane, propane, butane, and gaseous derivatives thereof. Mixtures of different gaseous hydrocarbon fuel feedstocks may be used.

The solid fuel particles have a sufficiently small particle size to remain suspended during transport and use. This is affected by both the density of the solid fuel particles and the density of the gaseous hydrocarbon feedstock within which the solid fuel particles are suspended. The solid fuel particles will typically have a particles size less than 250 µm, and preferably less than 60 µm. In some non-limiting embodiments, the solid fuel particles may have a particle size less than 30 µm. In some non-limiting embodiments, the solid fuel particles have a particle size less than 20 µm. The solid fuel particles may have a particle size less than 10 µm. The solid fuel particles may have a particle size less than 5 µm. In some embodiments, the solid fuel particles have an average particle size less than 2.5 µm.

The solid fuel particles comprise finely-divided particles of an energetic or combustible fuel material. The solid fuel particles may be derived from a single source of energetic or combustible fuel materials or a blend or mixture of different energetic or combustible fuel materials may be used. In one non-limiting embodiment the solid fuel particles comprise fine coal particles, including coal-derived carbonaceous matter. When coal-derived carbonaceous matter has a sufficiently small size to be substantially free of inherent mineral matter, then it is referred to as coal-derived solid hydrocarbon. In some embodiments the solid fuel particles comprise coal-derived solid hydrocarbon particles.

In some embodiments, the coal-derived solid carbonaceous matter contains reduced amounts of coal-derived mineral matter and reduced amounts of sulfur. In one non-limiting embodiment, the coal-derived solid carbonaceous matter contains less than 1 wt. % coal-derived mineral matter. In one non-limiting embodiment, the coal-derived solid carbonaceous matter contains less than 0.5 wt. % sulfur.

The solid fuel particles suspended in the gaseous combustible fuel disclosed herein are sometimes referred to as Micro Clean Carbon Fuel (µCCF).

A dispersant may be used with the coal-derived solid carbonaceous matter to inhibit agglomeration of the fine particles. In one non-limiting embodiment, the dispersant comprises an organic acid. The dispersant may be an organic acid selected from linear, cyclic, saturated, or unsaturated carboxylic acid and polycarboxylic acids. In one currently preferred embodiment, the dispersant is citric acid. In another non-limiting embodiment, the dispersant is a lignosulfonate-based surfactant. Another dispersant class that may be used are non-ionic dispersants such as polyethylene oxide dispersants.

The solid fuel particles may also be derived from organic materials, including waste organic materials. In still another embodiment, the solid fuel particles are derived from waste biomass. Further, the solid fuel particles may be a refined bioproduct, such as sugars, starches, cellulose, flour, etc. Even further, the solid fuel particles may consist of any naturally occurring or synthesized solid fuel compound, including polymers, e.g. any carbonaceous material.

An object of the invention is to increase the volumetric energy density of the gaseous hydrocarbon feedstock. The energy density improvement, relative to the gaseous hydrocarbon feedstock, is at least 25% greater, at atmospheric pressure. In some embodiments, the improvement in volumetric energy density is at least 50%. In some embodiments, the improvement in volumetric energy density is at least 100%. In some embodiments, the improvement in volumetric energy density is at least 500%.

In one non-limiting embodiment, the solid fuel particles have a size less than 30 µm and an energy density greater than 5000 Btu/lb. In another non-limiting embodiment, the solid fuel particles have a size less than 30 microns and a density greater than 500 kg/m$^3$. In yet another non-limiting embodiment, the solid fuel particles have an energy density greater than 5000 Btu/lb and a density greater than 500 kg/m$^3$.

In one non-limiting embodiment, the gaseous hydrocarbon fuel feedstock is natural gas, the solid fuel particles comprise coal-derived solid carbonaceous matter and have a particle size less than 10 μm, the gaseous hydrocarbon fuel feedstock has a volumetric energy density at atmospheric pressure and the gaseous combustible fuel has an energy density at atmospheric pressure which is at least 25% greater than the volumetric density of the gaseous hydrocarbon fuel feedstock.

The gaseous hydrocarbon fuel feedstock may comprise greater than 90 volume % natural gas and has an energy density greater than 45,000 BTU/m$^3$.

In some embodiments, the gaseous combustible fuel has an energy density in the range from 45,000 to 300,000 BTU/m$^3$ at atmospheric pressure.

In one non-limiting embodiment, the gaseous combustible fuel feedstock has a pressure in the range from 2 to 100 atmospheres. Pressurization enables the gaseous combustible fuel to be transported via pressurized gas distribution pipelines. In China, for example, natural gas is distributed at a pressure of about 60 atmospheres. In the U.S., natural gas is distributed at a pressure of about 100 atmospheres.

A method of transporting a gaseous combustible fuel may include suspending solid fuel particles in a gaseous hydrocarbon fuel feedstock to form a gaseous combustible fuel. The gaseous combustible fuel may be pressurized to a pressure suitable for transport. Such pressures typically range from about 60 to 100 atmospheres (atm) for long distance transportation. Residential gas distribution lines range from about 1 to 7 atm (15 to 120 pounds per square inch (psi)). Gas distribution going into homes is often regulated down to about 0.25 psi.

In one non-limiting embodiment of the method of transporting a gaseous combustible fuel, the gaseous hydrocarbon fuel feedstock comprises greater than 90 volume % natural gas and the solid fuel particles comprise coal-derived solid carbonaceous matter and have a particle size less than 30 μm.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 also shows the particle size distribution of the coal particles fed into the cyclone.

DESCRIPTION OF THE INVENTION

Figure 1:
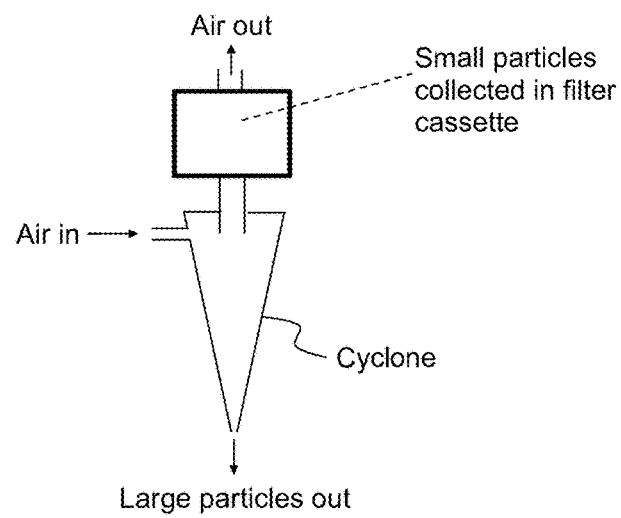
FIG. 1 shows a schematic representation of a cyclone used in some examples to separate solid fuel particles by particle size.

This disclosure relates to a modified combustible gaseous fuel, such as natural gas, containing suspended solid fuel particles. The disclosure also relates to a method of increasing the volumetric energy density of a combustible gaseous fuel by suspending small amounts of solid fuel particles within the gaseous fuel. The suspended solid fuel particles greatly enhance the energy density of the base combustible gaseous fuel.

The modified combustible gaseous fuel is a multi-phase fuel composition comprising a blend of combustible gaseous fuel, also referred to herein as gaseous hydrocarbon feedstock, and suspended solid fuel particles. Non-limiting examples of combustible gaseous fuels include natural gas, methane, ethane, propane, butane, etc. These gaseous combustible fuels can also be compressed and transported as a liquid. However, at the end-use, they are almost always transformed into and combusted in the gaseous form.

The solid fuel particles comprise finely-divided particles of an energetic or combustible fuel material. In one non-limiting embodiment the solid fuel particles comprise fine coal particles. More specifically, the fine coal particles comprise coal-derived carbonaceous matter. When milled to a sufficiently small size to be substantially free of inherent mineral matter, coal-derived carbonaceous matter exists as coal-derived solid hydrocarbon. In another non-limiting embodiment the solid fuel particles comprise coal-derived solid hydrocarbon particles.

In another embodiment the solid fuel particles are derived from organic materials, including waste organic materials. In still another embodiment, the solid fuel particles are derived from waste biomass. Non-limiting examples of waste biomass include sawdust, plant cuttings, wood chips, and plant stalks. Further, the solid fuel particles may be a refined bioproduct. Non-limiting examples of a refined bioproduct include sugars, starches, cellulose, flour, etc. Even further, the solid fuel particles may consist of any synthesized solid fuel compound. Non-limiting examples of synthesized solid fuel compounds include which include polymers such as polyethylenes, polypropylenes, polycarbonates, polystyrenes, rubbers, etc. The synthesized solid fuel compounds may be waste organic materials, including waste polymers. Non-limiting examples of waste polymers include used tires, polypropylene grocery bags, and Styrofoam.

The solid fuel particles may be derived from a single source of energetic or combustible fuel materials. Alternatively, the solid fuel particles may be derived from a blend or mixture of different energetic or combustible fuel materials.

The solid fuel particles have a size that enables them to be easily suspended and to remain suspended in the combustible gaseous fuel for a practical period of time during storage, transport, and/or use. Stokes law defines the frictional force or drag force when the Reynold's number is low (e.g. for very small spherical particles) as it passes through a fluid or gas. When the drag force is set equal to the gravitational acceleration force, then a terminal velocity can be calculated for these very small particles. This case assumes no other forces other than the drag of calm air. Thus, Stokes Law can be used to calculate the settling velocity of a sphere of a given density in air or other gasses or liquids if the diameter is less than about 250 microns:

$$V = \frac{d^2 \cdot g}{18 \cdot \eta} \cdot (Ws - Wa)$$

Where d=the geometric diameter of the sphere (m)
Ws=the density of the sphere (kg/m$^3$)
Wa=the density of the air (kg/m$^3$)
g=acceleration due to gravity (m/s$^2$)
η=the viscosity of the fluid (kg/(m*s))

Table 2 shows the calculated settling velocity of spherical particles in air at normal temperature and pressure for diameters from 0.5 microns up to 60 microns when Ws=1200 kg/m$^3$, Wa=1.2 kg/m$^3$, g=9.8 m/s$^2$, and η=1.81× 10$^{-5}$ kg/(m*s) using a model based on Stokes Law.

TABLE 2

| diameter (μm) | Settling Velocity (m/s) |
| --- | --- |
| 0.5 | 9.01 × 10$^{-6}$ |
| 1 | 3.61 × 10$^{-5}$ |
| 2.5 | 2.25 × 10$^{-4}$ |
| 5 | 9.01 × 10$^{-4}$ |
| 10 | 3.61 × 10$^{-3}$ |
| 20 | 1.44 × 10$^{-2}$ |
| 30 | 3.25 × 10$^{-2}$ |
| 60 | 1.19 × 10$^{-1}$ |

A combustible gaseous fuel moving at velocity exceeding the settling velocity of the particles in suspension in the combustible gaseous fuel will keep said particles in suspension.

From Stokes Law and the foregoing discussion, it will also be appreciated that particles having a lower density will also possess a lower settling velocity. It is possible to suspend solid fuel particles in a gaseous hydrocarbon feedstock that have a greater particle size and a lower density compared so smaller and denser solid fuel particles. Thus, different types and sizes of solid fuel particles may be suspended and remain suspended in the combustible gaseous fuel.

As noted above, the solid fuel particles should have a particle size less than 250 μm, and more preferably less than 60 μm. In one non-limiting embodiment, the solid fuel particles have an average diameter less than 30 μm. In another embodiment, the solid fuel particles have an average diameter less than 20 μm. In yet another embodiment, the solid fuel particles have an average diameter less than 10 μm. In a further embodiment, the solid fuel particles have an average diameter less than 5 μm. In one non-limiting embodiment, 99% of the solid fuel particles are all less than 20 μm. In another non-limiting embodiment, 99% of the solid fuel particles are all less than 10 μm. In still another non-limiting embodiment, the solid fuel particles have an average size less than 2.5 μm. In other non-limiting embodiments, larger size and lower density solid fuel particles may be successfully used.

The time period during which the solid fuel particles remain suspended may vary depending upon the intended use of the modified combustible gaseous fuel. For example, if the modified combustible gaseous fuel is prepared on demand for immediate use, then the suspension time period may be short, such as seconds, minutes, or hours. In contrast, if the modified combustible gaseous fuel is stored for a period of time, then the practical suspension time period may be measured in days, weeks, or months. It will be appreciated that finer sized solid fuel particles will naturally remain suspended for a longer time period compared to larger sized solid fuel particles. A particle having a size of about 10 μm may remain suspended for minutes to hours, whereas a particle having a size of about 2.5 μm may remain suspended for days or weeks.

In one disclosed embodiment, the combustible gaseous fuel comprises natural gas and the suspended solid fuel particles comprise fine coal particles which include coal-derived carbonaceous matter. The amount of coal particles blended with natural gas may range from about 5 volume % or less, at atmospheric pressure. The coal particles may have an average particle size less than 30 μm.

A dispersant may be added to the fine coal particles to reduce particle agglomeration. In one non-limiting embodiment, the dispersant is an organic acid. The dispersant may be an organic acid selected from linear, cyclic, saturated, or unsaturated carboxylic acid and polycarboxylic acids. In one currently preferred embodiment, the dispersant is citric acid. In another non-limiting embodiment, the dispersant is a lignosulfonate based surfactant. Another dispersant class that may be used are non-ionic dispersants such as a polyethylene oxide dispersant.

Table 3, below, sets forth the dramatic energy density improvement that is observed with increasing amounts of fine coal particles with an average diameter of 30 μm or less blended with natural gas at normal temperature and pressure where the solid fuel particles have a heat content of 14,500 BTU/lb and a density of 1,200 kg/m$^3$.

TABLE 3

| % of BTU from μCCF | Volume % μCCF | Volumetric Energy Density (BTU/m$^3$) | % Increase in Volumetric Energy Density | Mass % μCCF |
| --- | --- | --- | --- | --- |
| 0% | 0% | 37,038 | 0% | 0.0% |
| 10% | 0.01% | 41,149 | 11% | 13.9% |
| 20% | 0.02% | 46,286 | 25% | 26.6% |
| 30% | 0.04% | 52,889 | 43% | 38.3% |
| 40% | 0.06% | 61,690 | 67% | 49.1% |
| 50% | 0.10% | 74,004 | 100% | 59.2% |
| 60% | 0.14% | 92,460 | 150% | 68.5% |
| 70% | 0.22% | 123,181 | 233% | 77.2% |
| 80% | 0.38% | 184,476 | 398% | 85.3% |
| 83.4% | 0.48% | 222,042 | 500% | 87.9% |

TABLE 3-continued

| % of BTU from μCCF | Volume % μCCF | Volumetric Energy Density (BTU/m³) | % Increase in Volumetric Energy Density | Mass % μCCF |
|---|---|---|---|---|
| 90% | 0.86% | 367,186 | 891% | 92.9% |
| 95% | 1.80% | 727,410 | 1864% | 96.5% |

Solid fuel particles were blended with natural gas at normal temperature and pressure (NPT). NPT=20° C. and 1 atm. Solid fuel particles are blended in with natural gas in way such that 0% to 95% of the BTU of the blend comes from the solid fuel particles. The solid fuel particles have a heat content of 14,500 BTU/lb and a density of 1,200 kg/m³. The density of natural gas is 0.8 kg/m³. Because the density of the of the solid particles far exceeds the density of natural gas, the volume % of the solid fuel particle-natural gas blend or enhanced natural gas was less than 2 volume % even when 95% of the BTU of the enhanced natural gas comes from the solid fuel particles. When 83.4% of the BTU comes from the solid fuel particles, there is a 500% increase in BTU of the blend over natural gas alone.

The following non-limiting examples are given to illustrate several embodiments relating to the disclosed gaseous combustible fuel containing suspended solid fuel particles. It is to be understood that these examples are neither comprehensive nor exhaustive of the many types of embodiments which can be practiced in accordance with the presently disclosed invention.

Example 1

An experiment was designed to test whether fine coal particles settle in calm air as predicted by Stokes Law. First, fine coal particles of a defined size were obtained by passing the coal particles through a small cyclone. Cyclones are devices that can be used to classify particles in flowing water or air based on size.

Figure 2:
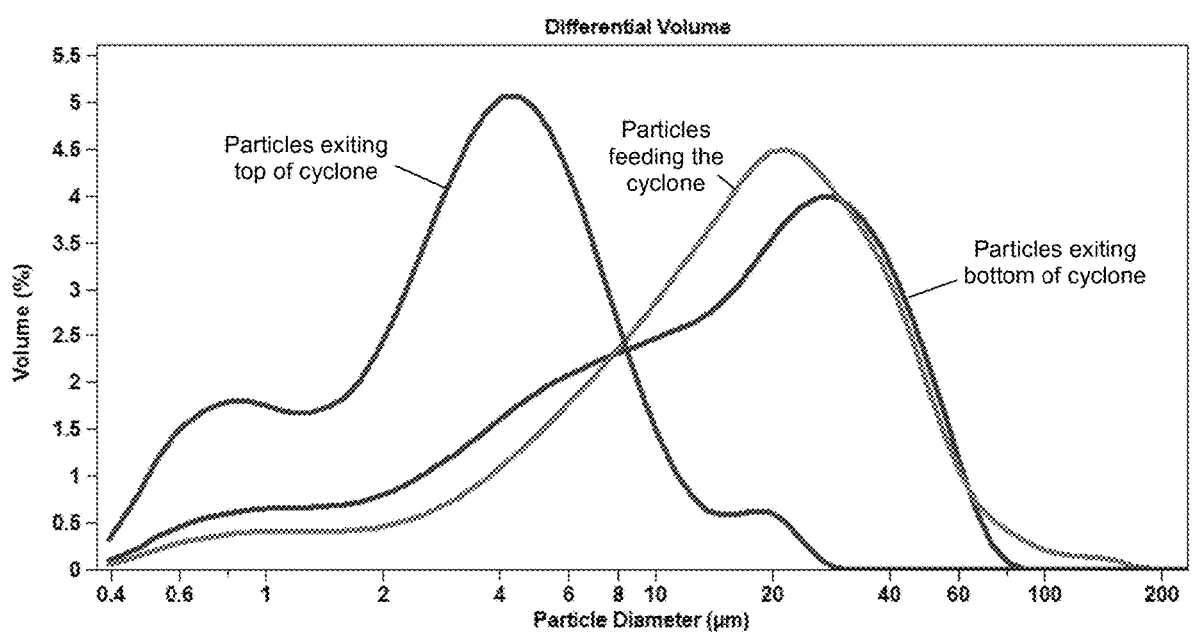
FIG. 2 is a graph of the differential volume by particle diameter of the fine particles that exited the top of the cyclone shown in FIG. 1 and the larger particles that exited the bottom of the cyclone.

The cyclone used in this experiment is depicted in FIG. 1. It had a bottom opening of about 4.7 mm and a top opening of 14.5 mm and was 105 mm tall. A small vacuum pump operating at a rate of 1.9 liters per minute was connected to the top port of the cyclone. Large particles that fell out of the bottom port were collected in a cap or grit pot. Small particles carried out of the top of the cyclone in the airstream were collected on fine filter paper before entering the vacuum. FIG. 2 shows a particle size analysis graph for the smaller particles that exited the top of the cyclone and the larger particles that exited the bottom of the cyclone. Also shown in FIG. 2 is the particle size distribution of the coal particles that fed into the cyclone. The fine particles exiting the top had an average particles size of 4.4 μm. The large particles exiting the bottom of the cyclone had an average particle size of 18.8 μm.

Figure 3:
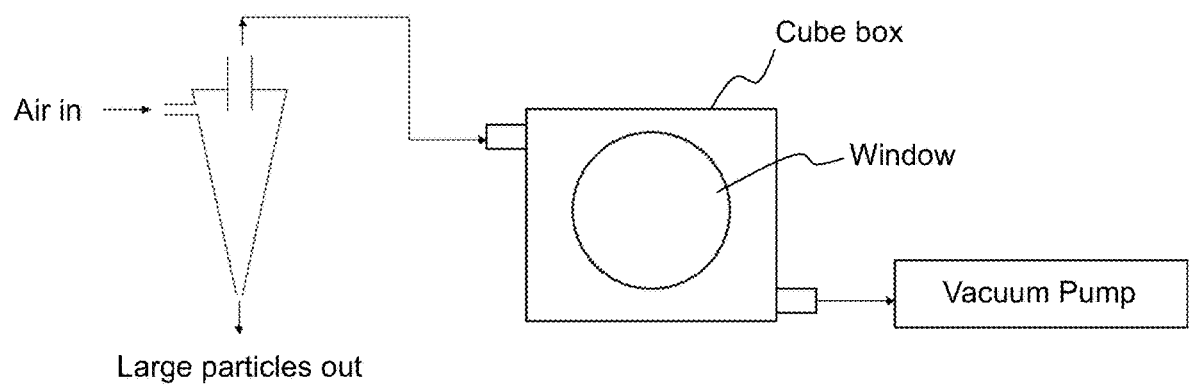
FIG. 3 shows a schematic representation of a cyclone used in some examples to separate solid fuel particles by particle size.

The cyclone was then set up as shown in FIG. 3. In this configuration, the fine particles exiting the cyclone were passed through a stainless steel cube box with inside wall lengths of 2.25" with a 1.5" diameter window on two sides so that one could see through the box and see suspended particles. The volumetric air flow of the vacuum pump was measured at 1.9 liters per minute. The tubing going from the cyclone to the steel box and from the steel box to the vacuum pump had a 6.9 mm inside diameter. Based on the volumetric air flow rate of the vacuum pump, the air velocity in the tube was calculated to be 0.85 m/s. The air velocity in the box slows down due to the larger cross-sectional surface are of the container and was calculated to be 0.0096 m/s.

According to Table 2, the settling velocity for particles suspended in air of a 60 μm diameter particle is 0.12 m/s, the settling velocity of a 30 μm particle is 0.033 m/s, the settling velocity of a 20 μm particle is 0.014 m/s, and the settling velocity of a 10 μm particle is 0.0036 m/s. From FIG. 2, some 30 and 60 μm particles are in the feed particles. The air velocity in the tubing is greater than the settling velocity for particles in this range and thus, they should be able to be transported in the tubing. However, the air velocity inside the box is lower than the settling velocity of these particles. Thus, particles larger than 30 microns are not expected to remain in suspension inside the box with the volumetric air flow rate of this experimental setup.

According to Table 2, the settling velocity of a 10 μm particle is 0.0036 m/s. The air velocity inside the box is 0.0096 m/s which is greater than the settling velocity of 10 μm particles. Thus, particles 10 μm and smaller are expected to be in suspension in the box when air is flowing through it at the volumetric rate of 1.9 liters per minute.

When the experimental setup described herein and shown in FIG. 3 was operating, the particles exiting the top of the cyclone and travelling into the box had an average particle size of 4.4 μm. A light shined through the back window of the box. The particles could be observed traveling in the current of air as it expanded from the volume of the tube entering the box to the volume of the box. As long as the pump was left on and particles were being delivered to the cyclone, particles entered and exited the box without settling to the bottom of the box.

When the pump was turned off, the flow of air stopped. The particles could then be observed to slowly drift to the bottom of the box. The time required for the particles to travel 1 cm was measured to be approximately 10 seconds, corresponding to a settling velocity of 0.001 m/s. This settling velocity matches the calculated settling velocity of 0.0009 m/s for a 5 μm diameter particle.

The cyclone was then removed from the experimental setup so that the suction tube fed the particles into the box. As stated above, any 30 μm and 60 μm particles are expected transport in the tubing but are then expected to settle soon after entering the box, based on the calculated air velocity for the two different cross-sectional areas. Particles in the size range of about 10 μm in the feed are expected to remain suspended in the box because the air velocity in the box exceeds their settling velocity.

When the feed was introduced directly into the box by removing the cyclone from the experimental setup, a higher density of particles was visually observed in the box. When the vacuum pump was shut off and air velocity went to zero, the particles were observed to settle more quickly indicating a population of larger diameter particles. The time required for the particles to travel 1 cm was measured to be approximately 0.8 seconds, corresponding to a settling velocity of 0.012 m/s. The air velocity inside the box calculated from the volumetric flow rate and the cross-sectional area was calculated to be 0.0096 m/s, which is slightly lower than the measured settling rate of 0.012 m/s. The visual method for measuring settling rate may not be accurate enough. However, the fact that the two rates are on the same order and so close to one another validates the assumption that air velocity greater than the settling rate of a particle will keep that particle in suspension in a flowing gas. The settling velocity for a 10 μm diameter particle was calculated to be 0.0036 m/s. Thus, the particles must be larger than 10 μm and smaller than 30 μm on average. In fact, a particle with a diameter of 18.25 μm would have a settling velocity in air at normal pressure and temperature of 0.012 m/s.

Example 2

Figure 4:
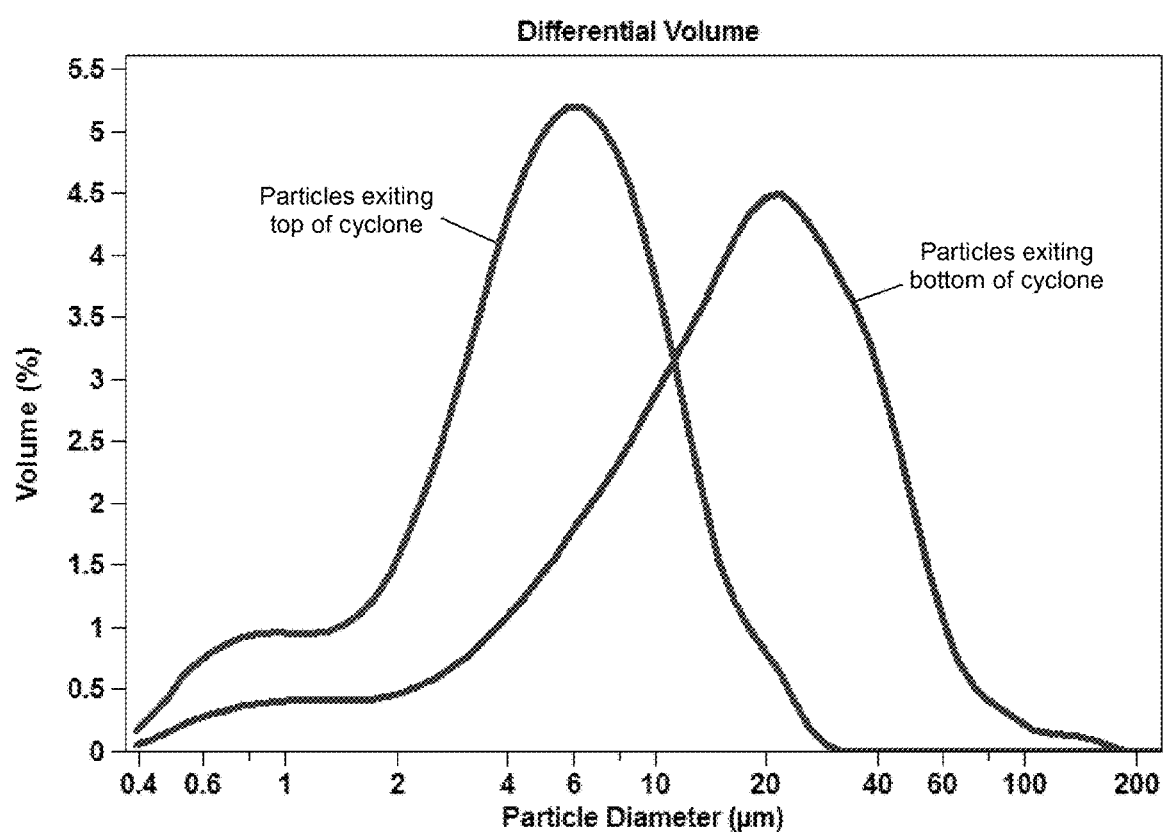
FIG. 4 is a graph of the differential volume by particle diameter of the fine particles that exited the top of the cyclone shown in FIG. 3 and the larger particles that exited the bottom of the cyclone.

A larger cyclone was used as part of a powder capture system. The large and small dimensions of the cone were 27.5 cm and 7.3 cm, respectively. The cyclone was 61 cm tall. FIG. 4 shows a graph of the differential volume by particle diameter of the large particles exiting the small opening at the bottom of the cyclone and the small particles carried with the airstream exiting the top of the cyclone. The average particle sizes were 21.4 μm and 6.2 μm respectively. Note that the larger particles were the feedstock used for the experiment with the small cyclone discussed in Example 1, above. The fine particles with an average particle size were transported in metal ducting over 50 feet away without significant sedimentation to the sidewalls of the ducting. Once the ducting was coated with a thin film of fine particles due to static charges, losses were negligible.

Example 3

When a common liquid propane canister is filled with propane, the bulk of the propane is liquid. However, at any typical ambient temperature, a certain amount of the liquid propane will enter the gaseous phase until the pressure of the gas inside the canister equals the vapor pressure of propane at that temperature. For example, the pressure inside a liquid propane tank that contains pure propane will be about 127 pounds per square inch (psi) at 71 degrees Fahrenheit. As propane gas is removed from the canister to power a burner, for example, more liquid propane enters the gaseous phase to maintain the pressure equilibrium inside the canister at the ambient temperature.

A 1 liter liquid propane canister was fabricated such that it could be opened and filled with a small volume fine coal particles. A stirrer was added internal to the system to keep the fine coal particles well distributed in the liquid propane. The canister could then be evacuated with a vacuum to remove air and refilled with liquid propane. The stirrer kept the coal particles in suspension inside of the liquid propane. It was assumed that as propane gas was removed from the canister, some coal particles would also exit. Then as the gaseous propane was burned, the fine coal particles that were transported in the gaseous phase out of the canister with the propane gas would be burned as well.

This canister was first tested with propane only by connecting it to a burner. The color of the flame was blue as expected for propane. Coal is known to burn orange. When coal particles were introduced into the canister, the resulting flame was orange and blue. As the concentration of coal particles increased, the flame became more orange. In this experiment, there was not fine control over the amount of coal blended with the propane gas exiting the canister, but the color of the flame indicated that fine coal particles were introduced into the propane gas stream and burned along with it in the burner.

Example 5

Various other fine particles were also blended with propane as examples of solid fuels that could be blended with a gaseous fuel source inside the modified liquid propane canister: starch, sugar, flour, polycarbonate, chicken manure, and sawdust. All these solid fuels caused the flame to change from blue to orange as the concentration of the fine particles entrained in the gaseous propane increased.

Example 6

A solid fuel particle with an average size of 30 μm was blended with natural gas. The settling velocity was determined at various pressures. A 100× increase in pressure from 1 atm to 100 atm only resulted in a 26% decrease in settling velocity. The reduction in settling velocity was mainly due to the slight increase in natural gas density with increasing pressure as the increase in drag at the elevated pressures was insignificant. As the gas volume decreased with increasing pressure, the gas density and volumetric energy density both increased.

Table 4. Volume Percent and Volumetric Energy Density of natural gas blended with 50% of BTU from solid fuel particles, referred to as micro clean carbon fuel (μCCF), at different pressures. The clean carbon fuel particles were 14,500 BTU/lb and 1200 kg/m$^3$.

TABLE 4

| Pressure (atm) | Volume % μCCF | Volumetric Energy Density (Btu/m$^3$) | Settling Velocity (cm/sec) | % change in Volumetric Energy Density | % change in settling velocity |
|---|---|---|---|---|---|
| 1 | 0.09% | 71,974 | 5.34 | — | — |
| 5 | 0.47% | 358,527 | 4.83 | 398% | −9.5% |
| 10 | 0.93% | 713,718 | 4.62 | 892% | −13.4% |
| 20 | 1.84% | 1,414,279 | 4.29 | 1865% | −19.6% |
| 40 | 3.62% | 2,777,360 | 3.88 | 3759% | −27.3% |
| 65 | 5.75% | 4,413,356 | 3.54 | 6032% | −33.7% |
| 100 | 8.58% | 6,585,785 | 3.20 | 9050% | −40.0% |

Table 4 shows a natural gas system where 50% of the BTU of the solid fuel particle enhanced natural gas comes from the solid fuel particles. The solid fuel particles had an energy density of 14,500 BTU/lb and a density of 1200 kg/m$^3$. The increase in the volume % with increasing pressure is shown. Natural gas is transported at elevated pressures. In the US and China, those transportation pressures often range between 65 and 100 atmospheres for long distance transport.

At 100 atm, the volume percent of solid fuel particles only increased to 8.58%. Settling velocity is shown to decrease as pressure increases. This is due to the increasing density of the pressurized natural gas. In all cases, the velocity of the natural gas in the transportation pipeline must exceed about 3.2 cm/sec in order to maintain the fine 30 micron diameter solid fuel particles in suspension during transportation.

Example 7

Fine solid fuel particles are blended with different gaseous hydrocarbon fuel feed stocks and evaluated in terms of volumetric energy density at different heat contents of 5,000, 10,000, and 15,000 BTU/lb. The results with respect to the different gaseous hydrocarbon fuel feed stocks are reported in Table 5 for natural gas, Table 6 for propane, Table 7 for butane.

TABLE 5

Natural gas at NPT blended with solid fuel particles, designed μCCF in Table 5, where the density of the particles is 1,200 kg/m$^3$ for heat contents of 5,000, 10,000, and 15,000 BTU/lb.

| % of Btu from μCCF | Volume % of μCCF | Volumetric Energy Density (Btu/m$^3$) | % Increase in Volumetric Energy Density | Mass % μCCF |
|---|---|---|---|---|
| 0% | 0.00% | 37,038 | 0 | 0.0% |
| 10% | 0.03% | 41,140 | 11% | 31.8% |
| 20% | 0.07% | 46,265 | 25% | 51.2% |
| 30% | 0.12% | 52,848 | 43% | 64.3% |
| 40% | 0.19% | 61,614 | 66% | 73.7% |

TABLE 5-continued

Natural gas at NPT blended with solid fuel particles, designed μCCF in Table 5, where the density of the particles is 1,200 kg/m³ for heat contents of 5,000, 10,000, and 15,000 BTU/lb.

| 50% | 0.28% | 73,869 | 99% | 80.8% |
| 60% | 0.42% | 92,207 | 149% | 86.3% |
| 70% | 0.65% | 122,658 | 231% | 90.7% |
| 80% | 1.11% | 183,137 | 394% | 94.4% |
| 90% | 2.46% | 361,273 | 875% | 97.4% |
| 95% | 5.05% | 703,336 | 1799% | 98.8% |

μCCF Inputs 5,000 Btu/lb μCCF
1,200 kg/m³ μCCF Specific Gravity

Natural Gas Inputs 21,000 Btu/lb Natural Gas
0.80 kg/m³ Natural Gas

| % of Btu from μCCF | Volume % of μCCF | Volumetric Energy Density (Btu/m³) | % Increase in Volumetric Energy Density | Mass % μCCF |
| --- | --- | --- | --- | --- |
| 0% | 0.00% | 37,038 | 0 | 0.0% |
| 10% | 0.02% | 41,147 | 11% | 18.9% |
| 20% | 0.03% | 46,281 | 25% | 34.4% |
| 30% | 0.06% | 52,879 | 43% | 47.4% |
| 40% | 0.09% | 61,672 | 67% | 58.3% |
| 50% | 0.14% | 73,972 | 100% | 67.7% |
| 60% | 0.21% | 92,400 | 149% | 75.9% |
| 70% | 0.33% | 123,057 | 232% | 83.1% |
| 80% | 0.56% | 184,157 | 397% | 89.4% |
| 90% | 1.24% | 365,768 | 888% | 95.0% |
| 95% | 2.59% | 721,560 | 1848% | 97.6% |

μCCF Inputs 10,000 Btu/lb μCCF
1,200 kg/m³ μCCF Specific Gravity

Natural Gas Inputs 21,000 Btu/lb Natural Gas
0.80 kg/m³ Natural Gas

| % of Btu from μCCF | Volume % of μCCF | Volumetric Energy Density (Btu/m³) | % Increase in Volumetric Energy Density | Mass % μCCF |
| --- | --- | --- | --- | --- |
| 0% | 0.00% | 37,038 | 0 | 0.0% |
| 10% | 0.01% | 41,149 | 11% | 13.5% |
| 20% | 0.02% | 46,286 | 25% | 25.9% |
| 30% | 0.04% | 52,890 | 43% | 37.5% |
| 40% | 0.06% | 61,691 | 67% | 48.3% |
| 50% | 0.09% | 74,006 | 100% | 58.3% |
| 60% | 0.14% | 92,465 | 150% | 67.7% |
| 70% | 0.22% | 123,191 | 233% | 76.6% |
| 80% | 0.37% | 184,500 | 398% | 84.8% |
| 90% | 0.83% | 367,292 | 892% | 92.6% |
| 95% | 1.74% | 727,847 | 1865% | 96.4% |

μCCF Inputs 15,000 Btu/lb μCCF
1,200 kg/m³ μCCF Specific Gravity

Natural Gas Inputs 21,000 Btu/lb Natural Gas
0.80 kg/m³ Natural Gas

Table 5 shows natural gas blended with solid fuel particles at atmospheric pressure and 20° C. where the density of individual particles is 1,200 kg/m³, meaning one particle has this density and a solid block of this material would also have this density. The solid fuel particles have heat contents of 5,000, 10,000, and 15,000 BTU/lb. Coal derived solid hydrocarbon heat content generally ranges between about 13,500 to 15,000 BTU/lb. The range from 5,000 to 15,000 was chosen to show that the volume % of solid fuel particles (μCCF) changes slightly for natural gas in the three different tables in comparison to the total volume % even though the heat content changed significantly. For a material that is 5,000 BTU/lb and 1,200 kg/m³, if 95% of the BTU comes from natural gas, only 5.05% of the volume comes from solid fuel particles. The reason for the small volume content is because the solid fuel particles have a large density in comparison to the density of gas at normal temperature and pressure (NPT), wherein NPT is 20° C. and 1 atm.

TABLE 6

Propane blended with solid fuel particles at NPT where the density of the particles is 1,200 kg/m³ for heat contents of 5,000, 10,000, and 15,000 BTU/lb.

| % of Btu from μCCF | Volume % of μCCF | % Volumetric Energy Density (Btu/m³) | % Increase in Volumetric Energy Density | Mass % μCCF |
| --- | --- | --- | --- | --- |
| 0% | 0.00% | 89,471 | 0 | 0.0% |
| 10% | 0.08% | 99,338 | 11% | 32.4% |
| 20% | 0.17% | 111,650 | 25% | 51.9% |
| 30% | 0.29% | 127,447 | 42% | 64.9% |
| 40% | 0.45% | 148,449 | 66% | 74.2% |
| 50% | 0.67% | 177,740 | 99% | 81.2% |
| 60% | 1.00% | 221,432 | 147% | 86.6% |
| 70% | 1.55% | 293,604 | 228% | 91.0% |
| 80% | 2.63% | 435,572 | 387% | 94.5% |
| 90% | 5.74% | 843,372 | 843% | 97.5% |
| 95% | 11.39% | 1,585,647 | 1672% | 98.8% |

μCCF Inputs 5,000 Btu/lb μCCF
1,200 kg/m³ μCCF Specific Gravity

Gas Inputs 21,564 Btu/lb Propane
1.88 kg/m³ Propane

| % of Btu from μCCF | Volume % of μCCF | % Volumetric Energy Density (Btu/m³) | % Increase in Volumetric Energy Density | Mass % μCCF |
| --- | --- | --- | --- | --- |
| 0% | 0.00% | 89,471 | 0 | 0.0% |
| 10% | 0.04% | 99,375 | 11% | 19.3% |
| 20% | 0.08% | 111,475 | 25% | 35.0% |
| 30% | 0.14% | 127,631 | 43% | 48.0% |
| 40% | 0.22% | 148,783 | 66% | 59.0% |
| 50% | 0.34% | 178,339 | 99% | 68.3% |
| 60% | 0.50% | 222,549 | 149% | 76.4% |
| 70% | 0.78% | 295,903 | 231% | 83.4% |
| 80% | 1.33% | 441,385 | 393% | 89.6% |
| 90% | 2.95% | 868,284 | 870% | 95.1% |
| 95% | 6.04% | 1,681,384 | 1779% | 97.6% |

μCCF Inputs 10,000 Btu/lb μCCF
1,200 kg/m³ μCCF Specific Gravity

Gas Inputs 21,564 Btu/lb Propane
1.88 kg/m³ Propane

| % of Btu from μCCF | Volume % of μCCF | % Volumetric Energy Density (Btu/m³) | % Increase in Volumetric Energy Density | Mass % μCCF |
| --- | --- | --- | --- | --- |
| 0% | 0.00% | 89,471 | 0 | 0.0% |
| 10% | 0.03% | 99,388 | 11% | 13.8% |
| 20% | 0.06% | 111,776 | 25% | 26.4% |
| 30% | 0.10% | 127,693 | 43% | 38.1% |
| 40% | 0.15% | 148,895 | 66% | 48.9% |
| 50% | 0.22% | 178,540 | 100% | 59.0% |
| 60% | 0.34% | 222,924 | 149% | 68.3% |
| 70% | 0.52% | 296,677 | 232% | 77.0% |

TABLE 6-continued

Propane blended with solid fuel particles at NPT where the density of the particles is 1,200 kg/m³ for heat contents of 5,000, 10,000, and 15,000 BTU/lb.

| 80% | 0.89% | 443,358 | 396% | 85.2% |
| 90% | 1.99% | 876,918 | 880% | 92.8% |
| 95% | 4.11% | 1,715,919 | 1818% | 96.5% |

μCCF Inputs 15,000 Btu/lb μCCF
1,200 kg/m³ μCCF Specific Gravity

Gas Inputs 21,564 Btu/lb Propane
1.88 kg/m³ Propane

A similar trend for volume % is seen when propane is used as the gaseous hydrocarbon fuel feedstock at atmospheric pressure. However, the volume percentage of the solid fuel particles increased because the density of propane at atmospheric pressure is a little over twice as much as natural gas.

TABLE 7

Butane blended with solid fuel particles at NPT where the density of the particles is 1,200 kg/m³ for heat contents of 5,000, 10,000, and 15,000 BTU/lb.

| % of Btu from μCCF | Volume % of μCCF | % Volumetric Energy Density (Btu/m³) | % Increase in Volumetric Energy Density | Mass % μCCF |
|---|---|---|---|---|
| 0% | 0.00% | 118,745 | 0 | 0.0% |
| 10% | 0.10% | 131,808 | 11% | 32.5% |
| 20% | 0.22% | 148,099 | 25% | 52.0% |
| 30% | 0.38% | 168,986 | 42% | 65.0% |
| 40% | 0.59% | 196,732 | 66% | 74.3% |
| 50% | 0.89% | 235,378 | 98% | 81.2% |
| 60% | 1.33% | 292,919 | 147% | 86.7% |
| 70% | 2.05% | 387,697 | 226% | 91.0% |
| 80% | 3.47% | 573,146 | 383% | 94.5% |
| 90% | 7.48% | 1,098,688 | 825% | 97.5% |
| 95% | 14.57% | 2,028,860 | 1609% | 98.8% |

μCCF Inputs 5,000 Btu/lb μCCF
1,200 kg/m³ μCCF Specific Gravity

Gas Inputs 21,640 Btu/lb Butane
2.49 kg/m³ Butane

| % of Btu from μCCF | Volume % of μCCF | % Volumetric Energy Density (Btu/m³) | % Increase in Volumetric Energy Density | Mass % μCCF |
|---|---|---|---|---|
| 0% | 0.00% | 118,745 | 0 | 0.0% |
| 10% | 0.05% | 131,874 | 11% | 19.4% |
| 20% | 0.11% | 148,265 | 25% | 35.1% |
| 30% | 0.19% | 169,311 | 43% | 48.1% |
| 40% | 0.30% | 197,319 | 66% | 59.1% |
| 50% | 0.45% | 236,460 | 99% | 68.4% |
| 60% | 0.67% | 294,878 | 148% | 76.4% |
| 70% | 1.04% | 391,715 | 230% | 83.5% |
| 80% | 1.76% | 583,255 | 391% | 89.6% |
| 90% | 3.88% | 1,141,348 | 861% | 95.1% |
| 95% | 7.86% | 2,188,288 | 1743% | 97.6% |

μCCF Inputs 10,000 Btu/lb μCCF
1,200 kg/m³ μCCF Specific Gravity

Gas Inputs

TABLE 7-continued

Butane blended with solid fuel particles at NPT where the density of the particles is 1,200 kg/m³ for heat contents of 5,000, 10,000, and 15,000 BTU/lb.

21,640 Btu/lb Butane
2.49 kg/m³ Butane

| % of Btu from μCCF | Volume % of μCCF | % Volumetric Energy Density (Btu/m³) | % Increase in Volumetric Energy Density | Mass % μCCF |
|---|---|---|---|---|
| 0% | 0.00% | 118,745 | 0 | 0.0% |
| 10% | 0.03% | 131,865 | 11% | 13.8% |
| 20% | 0.07% | 148,321 | 25% | 26.5% |
| 30% | 0.13% | 169,419 | 43% | 38.2% |
| 40% | 0.20% | 197,515 | 66% | 49.0% |
| 50% | 0.30% | 236,782 | 99% | 59.1% |
| 60% | 0.45% | 295,537 | 149% | 68.4% |
| 70% | 0.69% | 393,073 | 231% | 77.1% |
| 80% | 1.18% | 586,705 | 394% | 85.2% |
| 90% | 2.62% | 1,156,313 | 874% | 92.8% |
| 95% | 5.38% | 2,247,148 | 1792% | 96.5% |

μCCF Inputs 15,000 Btu/lb μCCF
1,200 kg/m³ μCCF Specific Gravity

Gas Inputs 21,640 Btu/lb Butane
2.49 kg/m³ Butane

A similar trend for volume % is seen when butane is used as the gaseous hydrocarbon fuel feedstock at atmospheric pressure. However, the volume percentage of the solid fuel particles increased because the density of butane at atmospheric pressure is a little over twice as much as natural gas.

Example 8

Fine solid fuel particles of varying densities of 500, 850, and 1,200 kg/m³ are blended with natural gas and evaluated in terms of volumetric energy density at different solid fuel heat contents of 10,000, and 14,500 BTU/lb. The results with respect to the different heat contents are reported in Table 8 for the heat content of 10,000 BTU/lb and Table 9 for the heat content of 14,500 BTU/lb.

TABLE 8

Natural gas blended with solid fuel particles at NPT where the heat content was 10,000 BTU/lb for solid fuel particles densities of 500, 850, and 1,200 kg/m³.

| % of Btu from μCCF | Volume % of μCCF | Volumetric Energy Density (Btu/m³) | % Increase in Volumetric Energy Density | Mass % μCCF |
|---|---|---|---|---|
| 0% | 0.00% | 37,038 | 0 | 0.0% |
| 10% | 0.04% | 41,138 | 11% | 18.9% |
| 20% | 0.08% | 46,258 | 25% | 34.4% |
| 30% | 0.14% | 52,835 | 43% | 47.4% |
| 40% | 0.22% | 61,592 | 66% | 58.3% |
| 50% | 0.33% | 73,827 | 99% | 67.7% |
| 60% | 0.50% | 92,130 | 149% | 75.9% |
| 70% | 0.78% | 122,499 | 231% | 83.1% |
| 80% | 1.33% | 182,733 | 393% | 89.4% |
| 90% | 2.94% | 359,505 | 871% | 95.0% |
| 95% | 6.00% | 696,302 | 1780% | 97.6% |

μCCF Inputs 10,000 Btu/lb μCCF
500 kg/m³ μCCF Specific Gravity

Natural Gas Inputs

TABLE 8-continued

Natural gas blended with solid fuel particles at NPT where the heat content was 10,000 BTU/lb for solid fuel particles densities of 500, 850, and 1,200 kg/m³.

21,000 Btu/lb Natural Gas
0.80 kg/m³ Natural Gas

| % of Btu from µCCF | Volume % of µCCF | Volumetric Energy Density (Btu/m³) | % Increase in Volumetric Energy Density | Mass % µCCF |
|---|---|---|---|---|
| 0% | 0.00% | 37,038 | 0 | 0.0% |
| 10% | 0.02% | 41,144 | 11% | 18.9% |
| 20% | 0.05% | 46,274 | 25% | 34.4% |
| 30% | 0.08% | 52,866 | 43% | 47.4% |
| 40% | 0.13% | 61,648 | 66% | 58.3% |
| 50% | 0.20% | 73,929 | 100% | 67.7% |
| 60% | 0.30% | 92,321 | 149% | 75.9% |
| 70% | 0.46% | 122,892 | 232% | 83.1% |
| 80% | 0.78% | 183,736 | 396% | 89.4% |
| 90% | 1.75% | 363,904 | 883% | 95.0% |
| 95% | 3.62% | 713,943 | 1828% | 97.6% |

µCCF Inputs 10,000 Btu/lb µCCF
850 kg/m³ µCCF Specific Gravity
Natural Gas Inputs 21,000 Btu/lb Natural Gas
0.80 kg/m³ Natural Gas

| % of Btu from µCCF | Volume % of µCCF | Volumetric Energy Density (Btu/m³) | % Increase in Volumetric Energy Density | Mass % µCCF |
|---|---|---|---|---|
| 0% | 0.00% | 37,038 | 0 | 0.0% |
| 10% | 0.02% | 41,145 | 11% | 18.9% |
| 20% | 0.04% | 46,278 | 25% | 34.4% |
| 30% | 0.07% | 52,873 | 43% | 47.4% |
| 40% | 0.11% | 61,660 | 66% | 58.3% |
| 50% | 0.17% | 73,951 | 100% | 67.7% |
| 60% | 0.25% | 92,361 | 149% | 75.9% |
| 70% | 0.39% | 122,977 | 232% | 83.1% |
| 80% | 0.67% | 183,952 | 397% | 89.4% |
| 90% | 1.49% | 364,860 | 885% | 95.0% |
| 95% | 3.09% | 717,840 | 1838% | 97.6% |

µCCF Inputs 10,000 Btu/lb µCCF
1,000 kg/m³ µCCF Specific Gravity
Natural Gas Inputs 21,000 Btu/lb Natural Gas
0.80 kg/m³ Natural Gas Table 8 models the blending of solid fuel particles that have a heat content of solid fuel particles of 10,000 BTU/lb with natural gas at NPT. The density of an individual particle is modelled at 500, 850, and 1,200 kg/m³. For a particle with a medium heat content level of 10,000 BTU/lb and a density of 500 kg/m³ for each particle, the volume % of the solid fuel particles in the blend with natural gas blend is still only 6.0 volume % solid fuel particles when 95% of the BTU comes from coal because the density of the coal particles is still over 500 times greater than the density of the natural gas.

The large differential between the density of solid fuel particle and the natural gas at atmospheric pressure allows for the small volume % of the fuel particle blended with natural gas. Density drives the low volume % much more than heat content.

TABLE 9

Natural gas blended with solid fuel particles at NPT where the heat content was 14,500 BTU/lb for solid fuel particles densities of 500, 850, and 1,200 kg/m³.

| % of Btu from µCCF | Volume % of µCCF | Volumetric Energy Density (Btu/m³) | % Increase in Volumetric Energy Density | Mass % µCCF |
|---|---|---|---|---|
| 0% | 0.00% | 37,038 | 0 | 0.0% |
| 10% | 0.03% | 41,142 | 11% | 13.9% |
| 20% | 0.06% | 46,270 | 25% | 26.6% |
| 30% | 0.10% | 52,858 | 43% | 38.3% |
| 40% | 0.15% | 61,634 | 66% | 49.1% |
| 50% | 0.23% | 73,904 | 100% | 59.2% |
| 60% | 0.35% | 92,273 | 149% | 68.5% |
| 70% | 0.54% | 122,795 | 232% | 77.2% |
| 80% | 0.92% | 183,488 | 395% | 85.3% |
| 90% | 2.04% | 362,810 | 880% | 92.9% |
| 95% | 4.22% | 709,516 | 1816% | 96.5% |

µCCF Inputs 14,500 Btu/lb µCCF
500 kg/m³ µCCF Specific Gravity
Natural Gas Inputs 21,000 Btu/lb Natural Gas
0.80 kg/m³ Natural Gas

| % of Btu from µCCF | Volume % of µCCF | Volumetric Energy Density (Btu/m³) | % Increase in Volumetric Energy Density | Mass % µCCF |
|---|---|---|---|---|
| 0% | 0.00% | 37,038 | 0% | 0.0% |
| 10% | 0.02% | 41,147 | 11% | 13.9% |
| 20% | 0.03% | 46,281 | 25% | 26.6% |
| 30% | 0.06% | 52,880 | 43% | 38.3% |
| 40% | 0.09% | 61,673 | 67% | 49.1% |
| 50% | 0.14% | 73,975 | 100% | 59.2% |
| 60% | 0.20% | 92,405 | 149% | 68.5% |
| 70% | 0.32% | 123,068 | 232% | 77.2% |
| 80% | 0.54% | 184,184 | 397% | 85.3% |
| 90% | 1.21% | 365,888 | 888% | 92.9% |
| 95% | 2.52% | 722,054 | 1850% | 96.5% |

µCCF Inputs 14,500 Btu/lb µCCF
850 kg/m³ µCCF Specific Gravity
Natural Gas Inputs 21,000 Btu/lb Natural Gas
0.80 kg/m³ Natural Gas

| % of Btu from µCCF | Volume % of µCCF | Volumetric Energy Density (Btu/m³) | % Increase in Volumetric Energy Density | Mass % µCCF |
|---|---|---|---|---|
| 0% | 0.00% | 37,038 | 0 | 0.0% |
| 10% | 0.01% | 41,149 | 11% | 13.9% |
| 20% | 0.02% | 46,286 | 25% | 26.6% |
| 30% | 0.04% | 52,889 | 43% | 38.3% |
| 40% | 0.06% | 61,690 | 67% | 49.1% |
| 50% | 0.10% | 74,004 | 100% | 59.2% |
| 60% | 0.14% | 92,460 | 150% | 68.5% |
| 70% | 0.22% | 123,181 | 233% | 77.2% |
| 80% | 0.38% | 184,476 | 398% | 85.3% |
| 90% | 0.86% | 367,186 | 891% | 92.9% |
| 95% | 1.80% | 727,410 | 1864% | 96.5% |

µCCF Inputs 14,500 Btu/lb µCCF
1,200 kg/m³ µCCF Specific Gravity
Natural Gas Inputs 21,000 Btu/lb Natural Gas
0.80 kg/m³ Natural Gas Table 9 models the blending of solid fuel particles that have a heat content of solid fuel particles of 14,500 BTU/lb with natural gas at NPT. The density of an individual particle is modelled at 500, 850, and 1,200 kg/m³. With a heat content level of 14,500 BTU/lb and a density of 500 kg/m³ for each particle, the volume % of the solid fuel particle-natural gas blend is 4.22 volume % solid fuel particles when 95% of the BTU comes from solid fuel particles because the density of the solid fuel particles is still over 500 times greater than the density of the natural gas.

The large differential between the density of solid fuel particle and the natural gas at NPT allows for the small volume % of the fuel particle blended with natural gas. Density drives the low volume % much more than heat content.

Example 9

Fine solid fuel particles of varying densities from 1 to 1000 kg/m³ are blended with natural gas at NPT wherein 50% of the BTU comes from the solid fuel particles and the heat content of the solid fuel ranges from 5,000 to 15,000 BTU/lb. The results are reported in Table 10.

TABLE 10

| Density kg/m³ | 5,000 BTU/lb Volume % μCCF | 10,000 BTU/lb Volume % μCCF | 15,000 BTU/lb Volume % μCCF |
| --- | --- | --- | --- |
| 1 | 77.06 | 62.69 | 52.83 |
| 10 | 25.15 | 14.38 | 10.07 |
| 50 | 6.30 | 3.25 | 2.19 |
| 100 | 3.25 | 1.65 | 1.11 |
| 500 | 0.67 | 0.33 | 0.22 |
| 1000 | 0.33 | 0.17 | 0.11 |

Figure 5:
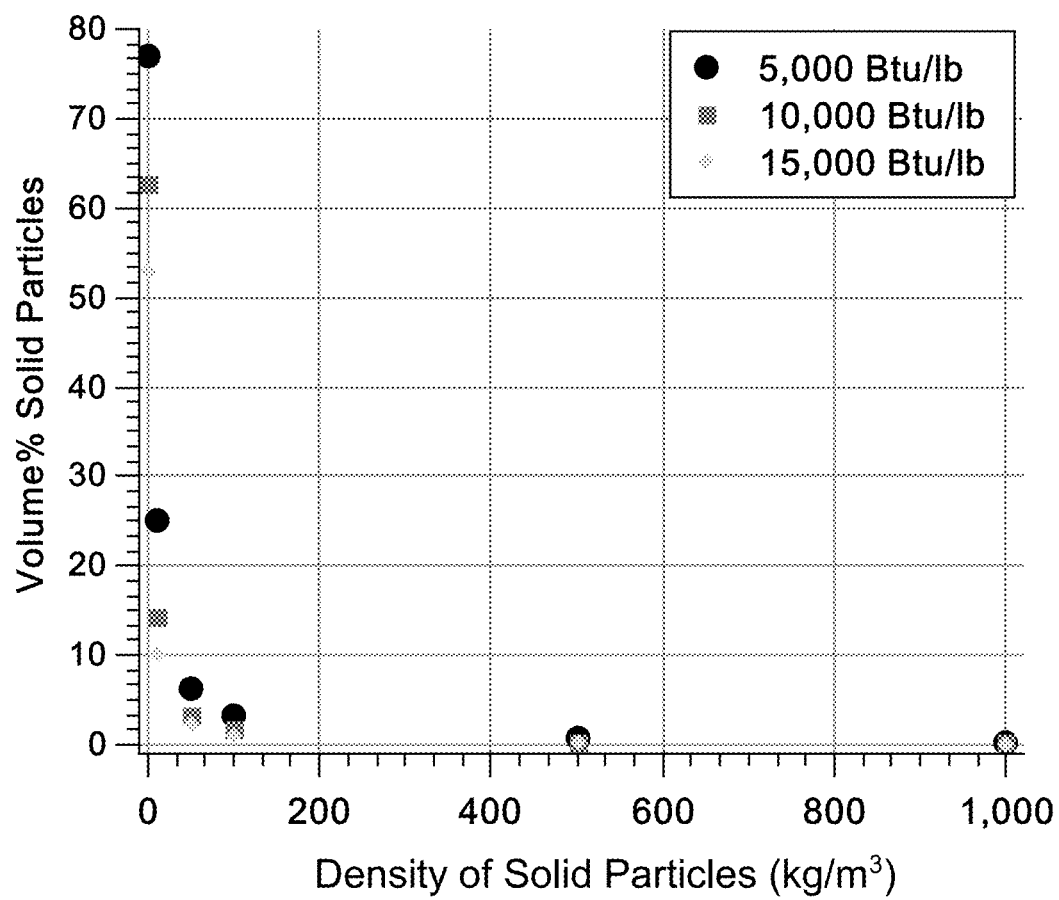
FIG. 5 is a graph of data for solid fuel particle blended in natural gas at NPT where 50% of the BTU comes from solid fuel particles with density ranging from 1 to 1000 kg/m$^3$ and heat content ranging from 5,000 to 15,000 BTU/lb.
Figure 6:
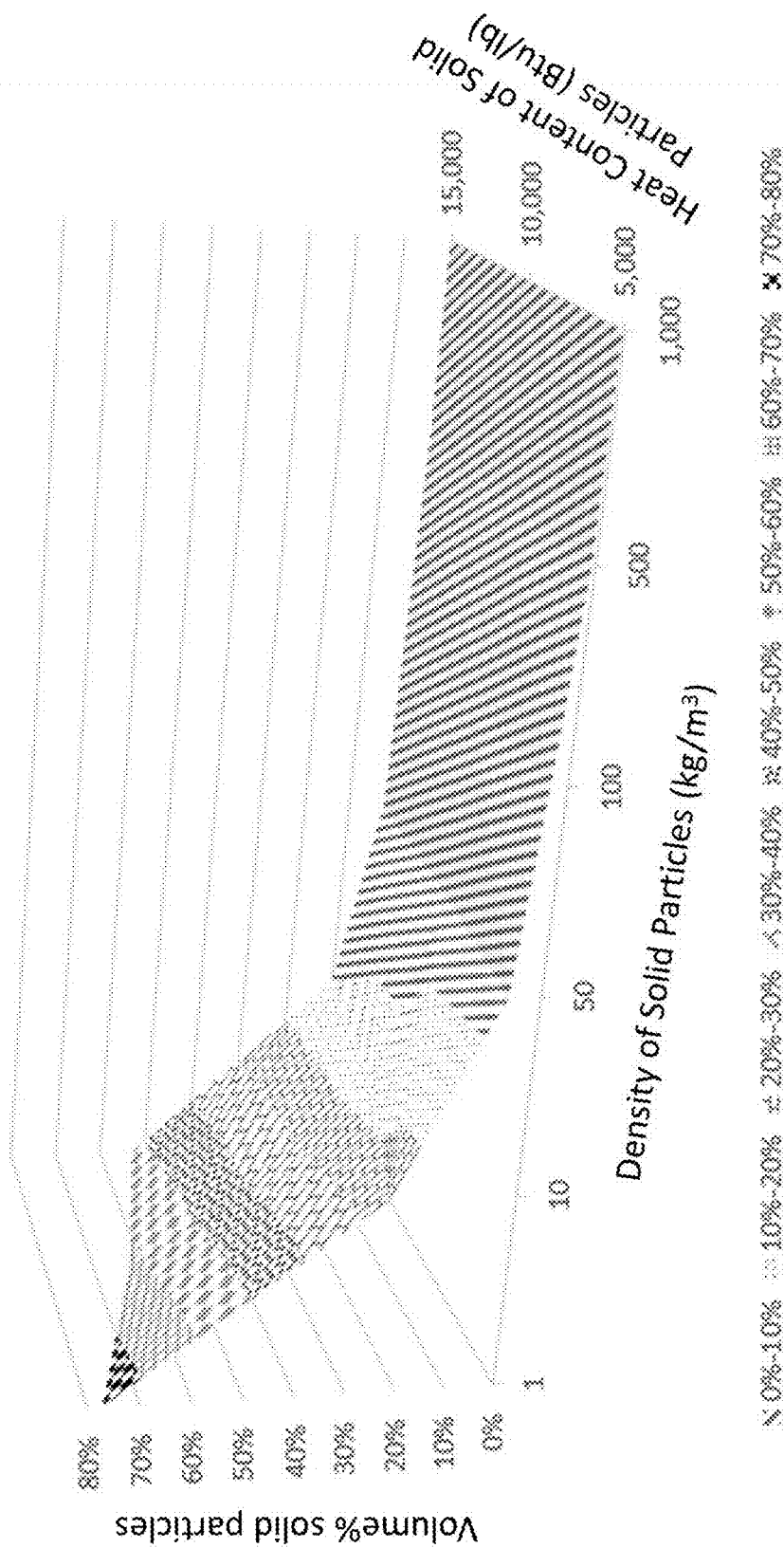
FIG. 6 is a three dimensional graph of data for solid fuel particle blended in natural gas at NPT where 50% of the BTU comes from solid fuel particles with density ranging from 1 to 1000 kg/m$^3$ and heat content ranging from 5,000 to 15,000 BTU/lb.

FIG. 5 and FIG. 6 are graphical representations of the data represented in Table 10. The density of the solid fuel particles (μCCF) modeled with this data starts at 1 kg/m³ which is approximately the density of air and slightly more dense than natural gas. If a solid fuel particle had a density of 1 kg/m³, similar to the density of natural gas, the volume percent of the solid fuel particles dominates the volume % of the blend. As solid fuel particle density exceeds 50 kg/m³, or in other words is about 62 times greater than the density of natural gas, volume percent of the enhanced combustible gaseous fuel blend is dominated by the volume of the combustible gaseous fuel because the difference in density between the solid particles and the natural gas particles. At particle densities greater than 50 kg/m³, the volume % of the solid fuel particles was less than 7%. This trend is very evident in the three dimensional surface graph shown in FIG. 6.

Figure 7:
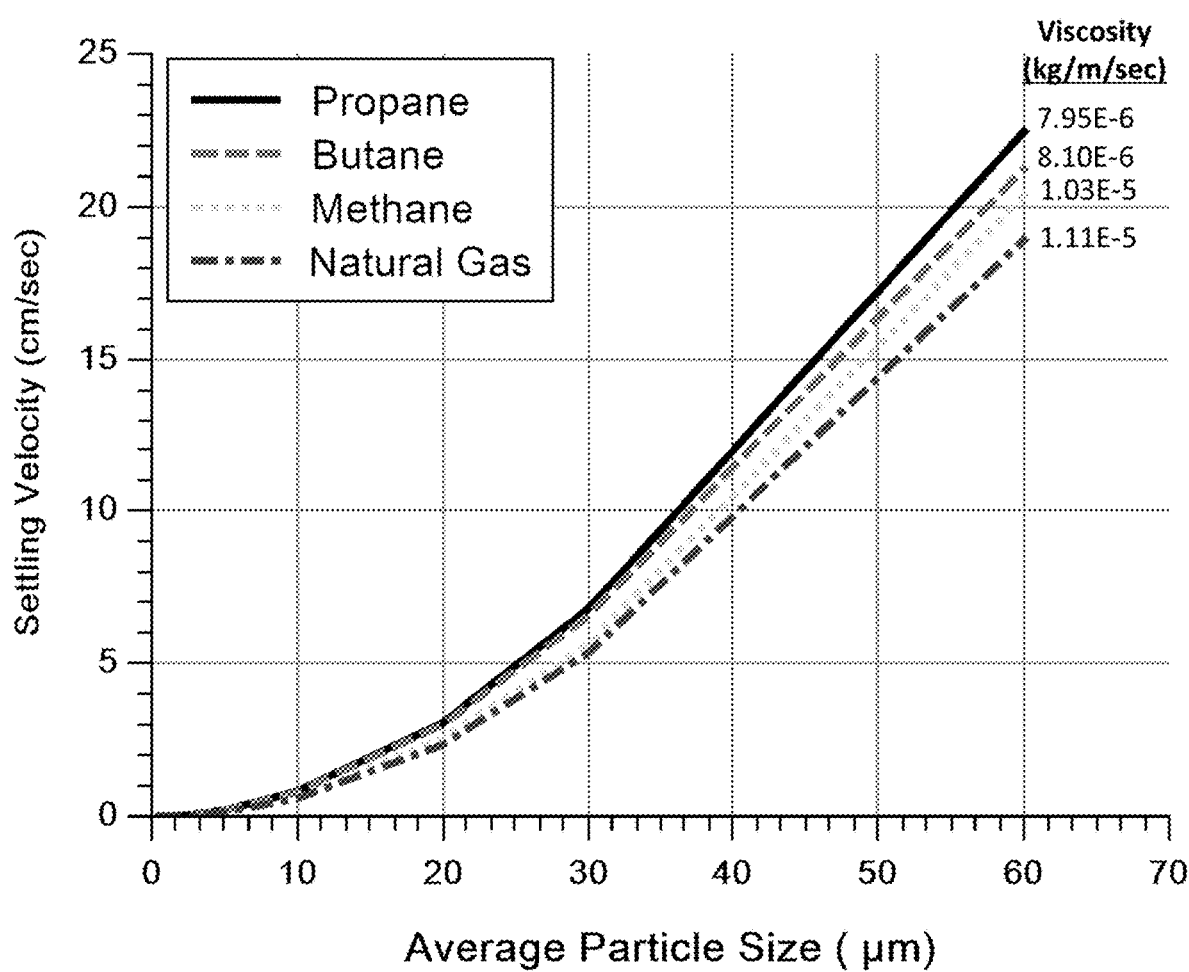
FIG. 7 is a graph of data for the settling velocity of solid fuel particles as a function of average particle size when blended in various gases at normal pressure and temperature. The viscosity of the gases is shown as a reference on the right hand side next to the termination of the data set for each gas.

FIG. 7 is a graph of data for settling velocity of solid fuel particles as a function of average solid fuel particle size when dispersed in butane, propane, methane, or natural gas at normal temperature and pressure. The data was calculated using a model based on Stokes Law. The solid fuel particles had a density of 1,200 kg/m³. Density and viscosity of the gases at NPT were used in calculating the data. Table 11 shows the tabulated data.

Table 11 shows settling velocity as a function of average particle size for solid fuel particles suspended in combustible gases at normal temperature and pressure. The density and viscosity of those gases is also shown.

TABLE 11

| Average Particle Size (μm) | Settling Velocity (cm/sec) | | | |
| --- | --- | --- | --- | --- |
| | Propane | Butane | Methane | Natural Gas |
| 0.5 | 0.002 | 0.002 | 0.002 | 0.001 |
| 1 | 0.008 | 0.008 | 0.006 | 0.006 |
| 2.5 | 0.051 | 0.05 | 0.04 | 0.037 |
| 5 | 0.205 | 0.201 | 0.158 | 0.147 |
| 10 | 0.821 | 0.805 | 0.634 | 0.587 |
| 20 | 3.062 | 3.008 | 2.536 | 2.347 |
| 30 | 6.786 | 6.553 | 5.597 | 5.336 |
| 60 | 22.458 | 21.251 | 20.351 | 18.919 |
| Density (kg/m³) | 1.8820 | 2.4890 | 0.6680 | 0.8000 |
| Viscosity (kg/m/sec) | 7.95E−06 | 8.10E−06 | 1.03E−05 | 1.11E−05 |

At normal temperature and pressure, the density of the gases contributes very little to the settling velocity of a solid particles suspended in the gases. The density of the gas is subtracted from the density of the solid fuel particle (1,200 kg/m³ in the case of this data) when using Stokes Law to calculate settling velocity. At 1,200 kg/m³, the result of the above mentioned subtraction is still so close to the 1,200 kg/m³ of the solid fuel particle that the density of the solid fuel particles dominates the settling velocity result. Viscosity is in the denominator and has a larger influence on settling velocity as can be seen in FIG. 7 where settling velocity goes down as viscosity increases. The dominating factor in this data set for settling velocity of solid fuel particles is the size of the particle. As the size of the particle increases, the mass of the particle increases, and the influence of gravity on the particle increases. The density of the particle is also a major factor in settling velocity because the mass of a particle is a function of both volume and density. In this experiment, the density of the particles was held constant at 1,200 kg/m³.

Figure 8:
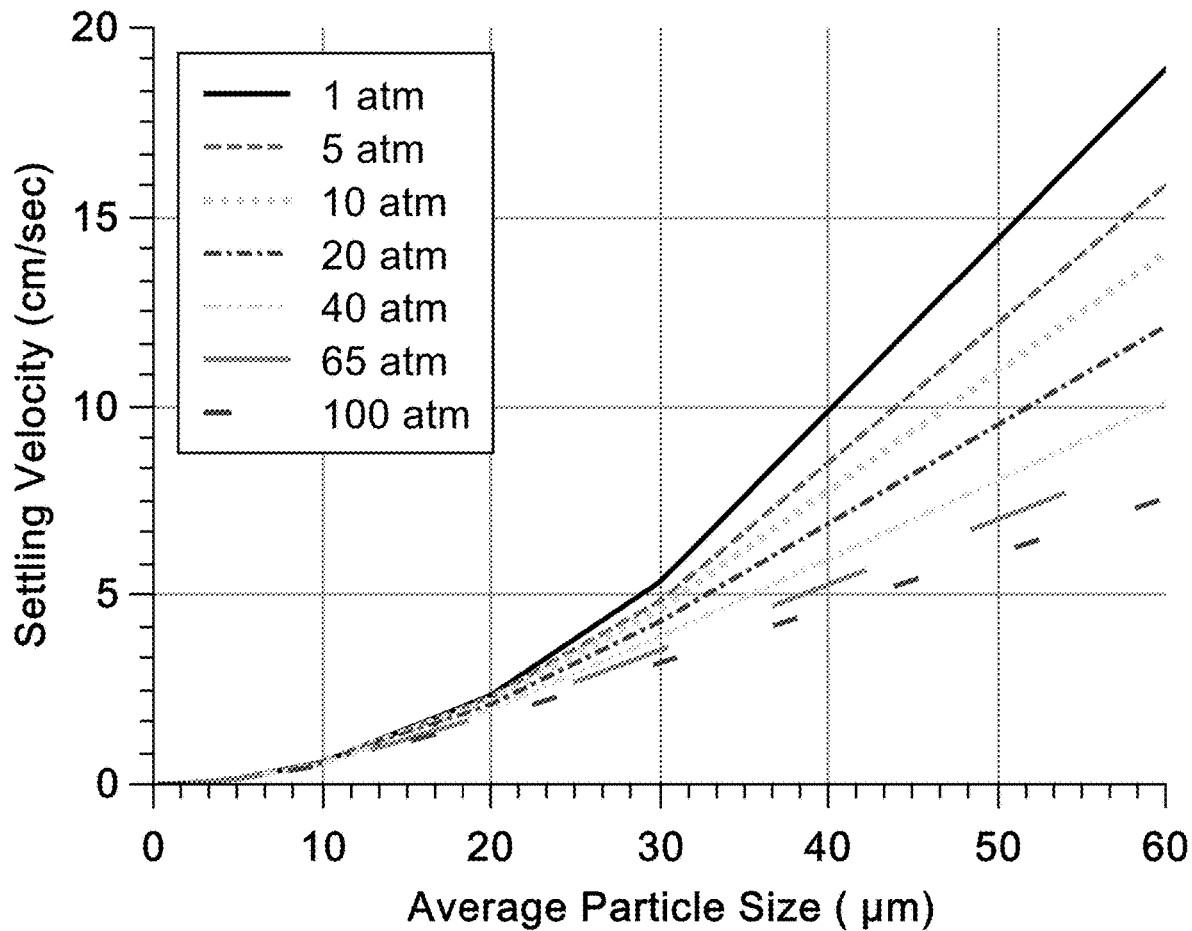
FIG. 8 is a graph of settling velocity of solid fuel particles ranging in average size up to 60 microns are provided for different pressures ranging from 1 to 100 atm.

Pressurized gas has a higher density than unpressurized gas. In a pressurized system transporting suspended fuel particles, the increased density of the gases would result in decreased settling velocities relative to settling velocity values of gases at normal temperature and pressure. Viscosity of gases is relatively independent of pressure and does not change much in the range of 1 atm to 100 atm. The settling velocities in the various combustible gases at normal temperature and pressure are the maximum settling velocities that are expected to be observed for transportation of solid fuel particles in combustible gases. To further illustrate this point, settling velocity of solid fuel particles ranging in average size up to 60 microns are provided for different pressures in FIG. 8. The viscosity of the gas is relatively unchanged over the pressure range shown. The density of the gas increases 100 times as pressure increases from 1 atm to 100 atm when temperature is held constant at 20° C. As FIG. 8 shows, the largest settling velocities that must be overcome in order to keep solid fuel particles suspended in a flowing natural gas stream, e.g. a natural gas pipeline, occur at normal temperature and pressure. The natural gas must be flowing at a rate greater than about 5.3 cm/sec to at atmospheric pressure and 20° C. for a 30 micron particle to stay suspended; whereas the flow rate falls to 3.2 cm/sec at 100 atm and 20° C. to keep the 30 micron particle suspended. The principle of maximum settling velocities for a system at normal temperature and pressure in comparison to a pressurized system holds true for other combustible gases as well.

The described embodiments and examples are all to be considered in every respect as illustrative only, and not as being restrictive. The scope of the invention is, therefore, indicated by the appended claims, rather than by the foregoing description. All changes that come within the meaning and range of equivalency of the claims are to be embraced within their scope.

The invention claimed is:

1. A gaseous combustible fuel comprising:
a gaseous hydrocarbon fuel; and
solid fuel particles suspended in the gaseous hydrocarbon fuel, wherein the solid fuel particles consist of fine coal having a particle size less than 60 μm, wherein the gaseous combustible fuel has a volumetric energy density in the range from 45,000 to 300,000 BTU/m$^3$ at atmospheric pressure.

2. The gaseous combustible fuel according to claim 1, wherein the gaseous hydrocarbon fuel is selected from natural gas, methane, ethane, propane, butane, and gaseous derivatives and mixtures thereof.

3. The gaseous combustible fuel according to claim 1, wherein the solid fuel particles comprise combustible particles having a heat content greater than 5000 BTU/lb.

4. The gaseous combustible fuel according to claim 1, wherein the solid fuel particles comprise combustible particles having a density greater than 500 kg/m$^3$.

5. The gaseous combustible fuel according to claim 1, wherein the solid fuel particles comprise combustible particles having a heat content greater than 5000 BTU/lb and a density greater than 500 kg/m$^3$.

6. The gaseous combustible fuel according to claim 1, further comprising a dispersant associated with the fine coal.

7. The gaseous combustible fuel according to claim 6, wherein the dispersant comprises an organic acid.

8. The gaseous combustible fuel according to claim 7, wherein the dispersant is citric acid.

9. The gaseous combustible fuel according to claim 7, wherein the dispersant is selected from linear, cyclic, saturated, or unsaturated carboxylic acid and polycarboxylic acids.

10. The gaseous combustible fuel according to claim 1, wherein the solid fuel particles have a particle size less than 30 μm.

11. The gaseous combustible fuel according to claim 1, wherein the solid fuel particles have a particle size less than 10 μm.

12. The gaseous combustible fuel according to claim 1, wherein the solid fuel particles have a particle size less than 5 μm.

13. The gaseous combustible fuel according to claim 1, wherein the gaseous hydrocarbon fuel has a volumetric energy density at atmospheric pressure and the gaseous combustible fuel has a volumetric energy density at atmospheric pressure which is at least 25% greater than the volumetric energy density of the gaseous hydrocarbon fuel.

14. The gaseous combustible fuel according to claim 1, wherein the gaseous hydrocarbon fuel has a volumetric energy density at atmospheric pressure and the gaseous combustible fuel has a volumetric energy density at atmospheric pressure which is at least 50% greater than the volumetric energy density of the gaseous hydrocarbon fuel.

15. The gaseous combustible fuel according to claim 1, wherein the gaseous hydrocarbon fuel has a volumetric energy density at atmospheric pressure and the gaseous combustible fuel has a volumetric energy density at atmospheric pressure which is at least 100% greater than the volumetric energy density of the gaseous hydrocarbon fuel.

16. The gaseous combustible fuel according to claim 1, wherein the gaseous hydrocarbon fuel has a volumetric energy density at atmospheric pressure and the gaseous combustible fuel has a volumetric energy density at atmospheric pressure which is at least 500% greater than the volumetric energy density of the gaseous hydrocarbon fuel.

17. The gaseous combustible fuel according to claim 1, wherein the gaseous hydrocarbon fuel is natural gas, wherein the solid fuel particles have a particle size less than 10 μm, wherein the gaseous hydrocarbon fuel has a volumetric energy density at atmospheric pressure, and the gaseous combustible fuel has a volumetric energy density at atmospheric pressure which is at least 25% greater than the volumetric density of the gaseous hydrocarbon fuel.

18. The gaseous combustible fuel according to claim 1, wherein the gaseous hydrocarbon fuel comprises greater than 90 volume % natural gas.

19. The gaseous combustible fuel according to claim 1, wherein the gaseous combustible fuel has a pressure in the range from 2 to 100 atmospheres.

20. The gaseous combustible fuel according to claim 1, wherein the solid fuel particles have a particle size less than 20 μm.

21. The gaseous combustible fuel according to claim 1, wherein the solid fuel particles have a particle size less than 2.5 μm.

22. The gaseous combustible fuel according to claim 1, wherein the solid fuel particles have an average diameter less than 30 μm.

23. The gaseous combustible fuel according to claim 1, wherein the solid fuel particles have an average diameter less than 20 μm.

24. A gaseous combustible fuel comprising:
a gaseous hydrocarbon fuel; and
solid fuel particles suspended in the gaseous hydrocarbon fuel, wherein the solid fuel particles consist of fine coal having an average diameter less than 10 μm, wherein the gaseous combustible fuel comprises greater that 90 volume % gaseous hydrocarbon fuel.

25. The gaseous combustible fuel according to claim 24, wherein the gaseous hydrocarbon fuel is selected from natural gas, methane, ethane, propane, butane, and gaseous derivatives and mixtures thereof.

26. The gaseous combustible fuel according to claim 24, wherein the solid fuel particles have an average diameter less than 5 μm.

27. The gaseous combustible fuel according to claim 24, wherein the gaseous hydrocarbon fuel has a volumetric energy density at atmospheric pressure and the gaseous combustible fuel has a volumetric energy density at atmospheric pressure which is at least 50% greater than the volumetric energy density of the gaseous hydrocarbon fuel.

28. The gaseous combustible fuel according to claim 24, wherein the gaseous hydrocarbon fuel has a volumetric energy density at atmospheric pressure and the gaseous combustible fuel has a volumetric energy density at atmospheric pressure which is at least 100% greater than the volumetric energy density of the gaseous hydrocarbon fuel.

29. A gaseous combustible fuel comprising:
a gaseous hydrocarbon fuel; and
solid fuel particles suspended in the gaseous hydrocarbon fuel, wherein the solid fuel particles consist of fine coal having a particle size less than 60 μm, wherein the gaseous hydrocarbon fuel comprises greater that 90 volumetric % natural gas and has an energy density greater that 45,000 BTU/m$^3$.

* * * * *